(12) United States Patent
Sobolevskiy et al.

(10) Patent No.: US 8,691,170 B2
(45) Date of Patent: Apr. 8, 2014

(54) SYSTEM AND METHOD FOR SELECTIVE CATALYTIC REDUCTION OF NITROGEN OXIDES IN COMBUSTION EXHAUST GASES

(75) Inventors: Anatoly Sobolevskiy, Orlando, FL (US); Joseph A. Rossin, Columbus, OH (US)

(73) Assignee: Siemens Energy, Inc., Orlando, FL (US)

( * ) Notice: Subject to any disclaimer, the term of this patent is extended or adjusted under 35 U.S.C. 154(b) by 1113 days.

(21) Appl. No.: 12/122,093

(22) Filed: May 16, 2008

(65) Prior Publication Data

US 2008/0299016 A1 Dec. 4, 2008

Related U.S. Application Data

(60) Provisional application No. 60/932,466, filed on May 31, 2007.

(51) Int. Cl.
*B01D 53/56* (2006.01)
*B01D 53/90* (2006.01)

(52) U.S. Cl.
USPC ........................................ 423/239.1; 422/111

(58) Field of Classification Search
USPC .............. 422/111, 148, 169, 171, 172, 182; 423/235, 239.1
See application file for complete search history.

(56) References Cited

U.S. PATENT DOCUMENTS

| | | | |
|---|---|---|---|
| 1,931,678 A | 10/1933 | Porter | |
| 3,493,519 A | 2/1970 | Kerr et al. | |
| 3,660,028 A | 5/1972 | Tamaru et al. | |
| 3,929,965 A * | 12/1975 | Kim et al. | 423/213.5 |
| 4,088,740 A | 5/1978 | Gaines | |
| 4,312,638 A | 1/1982 | Koump | |
| 4,566,267 A * | 1/1986 | Muller et al. | 60/784 |
| 4,789,656 A | 12/1988 | Chen et al. | |
| 5,120,695 A * | 6/1992 | Blumrich et al. | 502/78 |

(Continued)

FOREIGN PATENT DOCUMENTS

| | | |
|---|---|---|
| JP | 01127028 A | 5/1989 |
| WO | 2007019643 A1 | 2/2007 |

OTHER PUBLICATIONS

Brigitta Frank et al.; "Kinetics and Mechanism of the Reduction of Nitric Oxides by $H_2$ under Lean-Burn Conditions on a Pt—Mo—Co/a—$Al_2O_3$ Catalyst"; Applied Catalysis B: Environment 19, 1998, pp. 45-57.

(Continued)

*Primary Examiner* — Jill Warden
*Assistant Examiner* — Joye L Woodard

(57) ABSTRACT

A multi-stage selective catalytic reduction (SCR) unit (32) provides efficient reduction of NOx and other pollutants from about 50-550° C. in a power plant (19). Hydrogen (24) and ammonia (29) are variably supplied to the SCR unit depending on temperature. An upstream portion (34) of the SCR unit catalyzes NOx+$NH_3$ reactions above about 200° C. A downstream portion (36) catalyzes NOx+$H_2$ reactions below about 260° C., and catalyzes oxidation of $NH_3$, CO, and VOCs with oxygen in the exhaust above about 200° C., efficiently removing NOx and other pollutants over a range of conditions with low slippage of $NH_3$. An ammonia synthesis unit (28) may be connected to the SCR unit to provide $NH_3$ as needed, avoiding transport and storage of ammonia or urea at the site. A carbonaceous gasification plant (18) on site may supply hydrogen and nitrogen to the ammonia synthesis unit, and hydrogen to the SCR unit.

3 Claims, 3 Drawing Sheets

(56) References Cited

U.S. PATENT DOCUMENTS

| | | | |
|---|---|---|---|
| 5,233,934 | A * | 8/1993 | Krigmont et al. ............ 423/239.1 |
| 5,510,092 | A * | 4/1996 | Mansour et al. ............ 423/239.1 |
| 5,543,124 | A | 8/1996 | Yokota et al. |
| 5,589,142 | A | 12/1996 | Gribbon |
| 5,589,147 | A | 12/1996 | Farnos |
| 5,710,085 | A | 1/1998 | Absil et al. |
| 5,891,409 | A | 4/1999 | Hsiao et al. |
| 5,955,039 | A | 9/1999 | Dowdy |
| 6,689,709 | B1 | 2/2004 | Tran et al. |
| 6,914,026 | B2 | 7/2005 | Tran et al. |
| 7,049,261 | B2 | 5/2006 | Nam et al. |
| 7,105,137 | B2 | 9/2006 | Efstathiou et al. |
| 2004/0219088 | A1 * | 11/2004 | Wen et al. ..................... 423/359 |
| 2004/0237507 | A1 | 12/2004 | Duvinage et al. |
| 2006/0101809 | A1 | 5/2006 | Bodo et al. |
| 2007/0110643 | A1 | 5/2007 | Sobolevskiy et al. |
| 2007/0181854 | A1 | 8/2007 | Briesch et al. |
| 2007/0289214 | A1 | 12/2007 | Briesch et al. |
| 2008/0081844 | A1 | 4/2008 | Shires et al. |

OTHER PUBLICATIONS

Ola Maurstad; "An Overview of Coal Based Integrated Gasification Combined Cycle (IGCC) Technology", MIT Laboratory for Energy and the Environment, Publication No. LFEE 2005-002 WP; (http://free.mit.edu/publications); 2005, pp. i-iii and 1-44.

Guido Busca et al.; "Chemical and Mechanistic Aspects of the Selective Catalytic Reduction of $NO_x$ by Ammonia over Oxide Catalysts: A Review"; Applied Catalysis B, Environmental 18; 1998; pp. 1-36.

A. Bosch et al.; "The Catalytic Reduction of Nitrogen Oxides: A Review on the Fundamentals and Technology"; Catalysis Today; 1988; vol. 2, No. 4, pp. 369-531.

Chi-Cheng Liu, Hsisheng Teng; "Cu/MCM-41 for selective catalytic NO reduction with $NH_3$- comparison of different Cu-loading methods"; Applied Catalysis B: Environmental 58; 2005, pp. 69-77.

Gongshin Qi et al.; "Ultra-active Fe/ZSM-5 catalyst for selective catalytic reduction of nitric oxide with ammonia"; Applied Catalysis B: Environmental 60; 2005; pp. 13-22.

Ramon Moreno-Tost et al, "Selective catalytic reduction of nitric oxide by ammonia over Cu-exchanged Cuban natural zeolites"; Applied Catalysis B: Environmental 50; 2004; pp. 279-288.

Gerard Delahay et al; "Kinetics of the selective catalytic reduction of NO By $NH_3$ on a Cu-faujasite catalyst"; Applied Catalysis B: Environmental 52; 2004; pp. 251-257.

R. Q. Long et al., "Selective Catalytic Reduction of NO with Ammonia over $Fe_3+$- Exchanged Mordenite (Fe-MOR): Cataytic Performance, Characterization, and Mechanistic Study"; Journal of Catalysis 207; 2002; pp. 274-285.

Kevin J. Rogers; "SCR Inlet Maldistributions—Their Effects & Strategies for Their Control"; Proceedings of the 2002 Conference on Selective Catalytic Reduction and Selective Non-Catalytic Reduction for NOx Control, presented in the US May 15-16, 2002, and published by the National Energy Technology Laboratory on-line; pp. 1-2.

V. I. Parvulescu et al.; "Catalytic removal of NO"; Catalysis Today 46; 1998; pp. 233-316.

* cited by examiner

SYSTEM AND METHOD FOR SELECTIVE CATALYTIC REDUCTION OF NITROGEN OXIDES IN COMBUSTION EXHAUST GASES

CROSS-REFERENCE TO RELATED APPLICATIONS

This application claims benefit of the 31 May 2007 filing date of U.S. provisional application 60/932,466.

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

FIELD OF THE INVENTION

This invention relates to a system and a method for reduction of nitrogen oxides (NOx) in combustion exhaust by selective catalytic reduction (SCR) with ammonia and hydrogen as reducing agents. The invention relates generally to the field of power generation, and more particularly to the control of atmospheric pollutants produced during the combustion of a fuel containing hydrogen to produce power, and specifically to the catalytic treatment of exhaust gases from a gas turbine power generating station at a coal gasification plant.

BACKGROUND OF THE INVENTION

In order to reduce emissions of air pollutants, and especially Nitrogen Oxides (NOx) in the United States, the Environmental Protection Agency (EPA) is steadily tightening emissions standards for the power generation industry, including gas, oil, and coal-fired power plants. A progressive method to produce power is by gasification of coal and/or other carbonaceous materials, resulting in production of a hydrogen-containing fuel gas, followed by combustion of this fuel in a gas turbine. This method allows effective production of power, and allows reduction of emissions of several air pollutants such as CO, volatile organic compounds (VOCs), etc. into the ambient air. However, combustion of hydrogen or hydrogen-containing fuel in a gas turbine at high efficiency leads to a significant amount of NOx in the exhaust gases that must be removed.

Existing NOx reduction technologies include selective catalytic reduction (SCR) as an efficient way to reduce emissions of NOx to low levels. Various reducing agents can be used in SCR systems, including hydrocarbons, hydrogen, ammonia, urea, etc. Ammonia is the most efficient reducing agent at reducing NOx emissions to low levels. Urea also produces ammonia by its decomposition in the process of NOx reduction. However, ammonia has several disadvantages:

Ammonia is toxic, so its storage requires strong safety measures. Accidental release of ammonia from a storage tank is a hazard.

Ammonia slipping through the SCR process without reacting can reach levels of 5-10 ppm in the final exhaust, which is harmful to the environment.

Delivery of ammonia to a power generation station is hazardous.

Ammonia is not fully effective as a NOx reducing agent until the temperature in the SCR reactor reaches about 260-300° C. or higher, so NOx is not effectively reduced by ammonia during start-up cycles of power generation units, when exhaust temperatures are lower.

BRIEF DESCRIPTION OF THE DRAWINGS

The invention is explained in the following description in view of the drawings that show.

DETAILED DESCRIPTION OF THE INVENTION

The present invention provides a system and method for reducing NOx in exhaust gases, especially in those produced by combustion of hydrogen or a hydrogen-containing fuel such as a fuel gas from coal gasification. The invention provides high NOx reduction efficiencies over a wide range of operating temperatures, including start-up temperatures, and without a need for ammonia or urea delivery and storage. It is especially useful for power plants that use combustion devices such as gas turbines.

Figure 1:
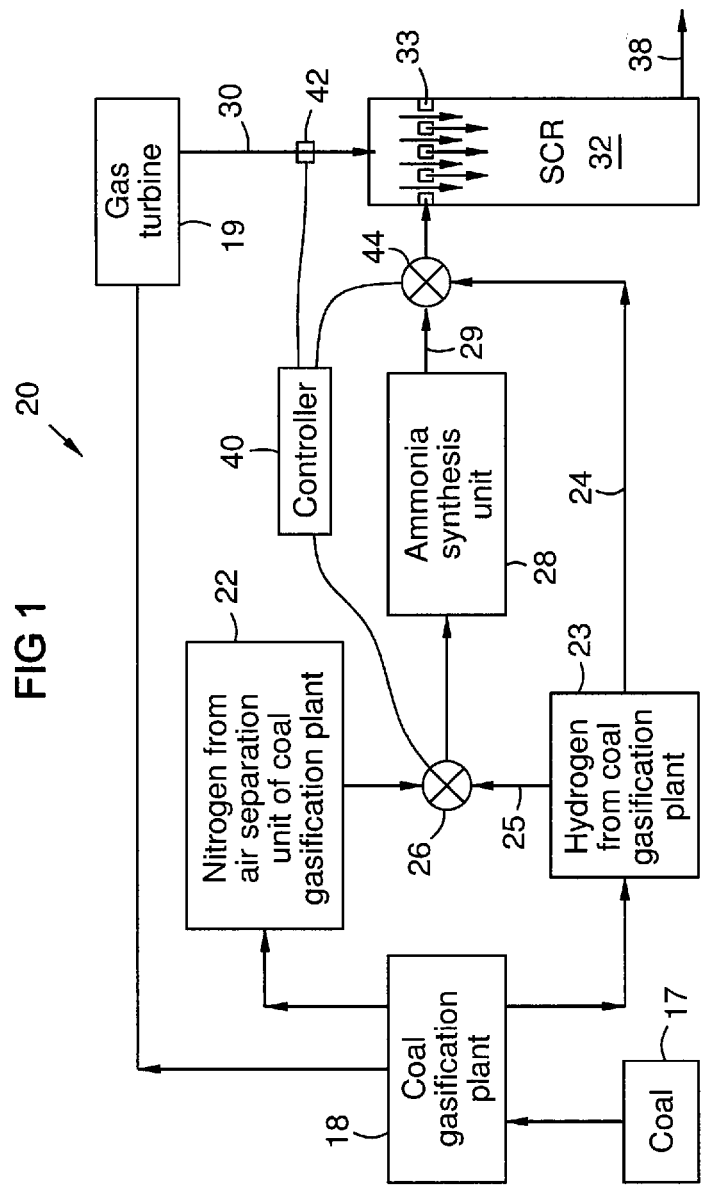
FIG. 1 is a schematic view of a system for selective catalytic reduction of NOx using ammonia and hydrogen produced on-site at a power generation plant using fuel gases from coal gasification.

FIG. 1 illustrates a NOx removal system 20 with an ammonia synthesis unit 28 and a multi-stage selective catalytic reduction unit (SCR) 32. The SCR unit 32 can utilize both hydrogen 24 and ammonia 29 as reducing agents. Nitrogen 22 and hydrogen 23 may be supplied to the ammonia synthesis unit 28 from a plant 18 that gasifies a carbonaceous material such as coal 17. The nitrogen 22 and hydrogen 23 may be mixed 26 and then converted to ammonia 29 in the ammonia synthesis unit 28. Any ammonia synthesis process may be used, such as the Haber process. The SCR unit 32 receives combustion exhaust 30 from a power plant gas turbine 19, injects 33 the reducing agent(s) 24, 29 into the exhaust 30, and reduces the concentration of NOx prior to release of the exhaust 38 to the atmosphere.

Figure 2:
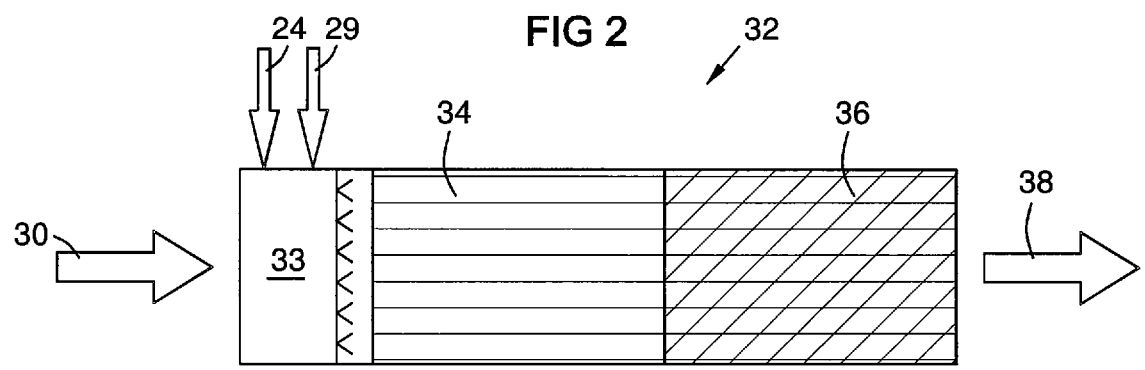
FIG. 2 is a schematic view of an SCR unit according to aspects of the invention.

As shown in FIG. 2, the SCR unit 32 may incorporate an ammonia/hydrogen injection grid 33 that injects and mixes the reducing agent(s) 24, 29 into the combustion exhaust 30. A multifunction catalytic element 34, 36 is located downstream of the injection grid 33. An upstream catalyst portion 34 of the catalytic element comprises a substrate of a suitable material such as zeolites or metal oxides impregnated and/or coated with a first catalytic material that promotes reactions between nitrogen oxides and ammonia to produce nitrogen and water. A downstream catalyst portion 36 may comprise the same substrate and the same catalytic material or a similarly-acting catalytic material as the upstream catalyst portion 34, plus one or more catalytic metals of the platinum group that, depending upon the temperatures of the exhaust, promote oxidizing reactions or reaction between nitrogen oxides and hydrogen.

The upstream catalyst portion 34 of the SCR unit 32 may comprise 10 to 90% of the total catalyst bed volume, preferably 40 to 60%. Embodiments of such catalytic materials are described in commonly assigned U.S. patent application Ser. No. 11/282,036, published on 17 May 2007 as Publication US 2007/0110643 A1 and incorporated herein by reference in its entirety. The downstream catalyst portion 36 of the catalytic element has an active component of platinum group metals.

Pd is preferred over Pt because Pd exhibits better catalytic selectivity to yield $N_2$ over NOx as a product of NOx+$NH_3$ reactions above 200° C. Pd also exhibits better catalytic selectively to yield $N_2$ over NOx as a product of NOx+$H_2$ reactions below 200° C.

Figure 3:
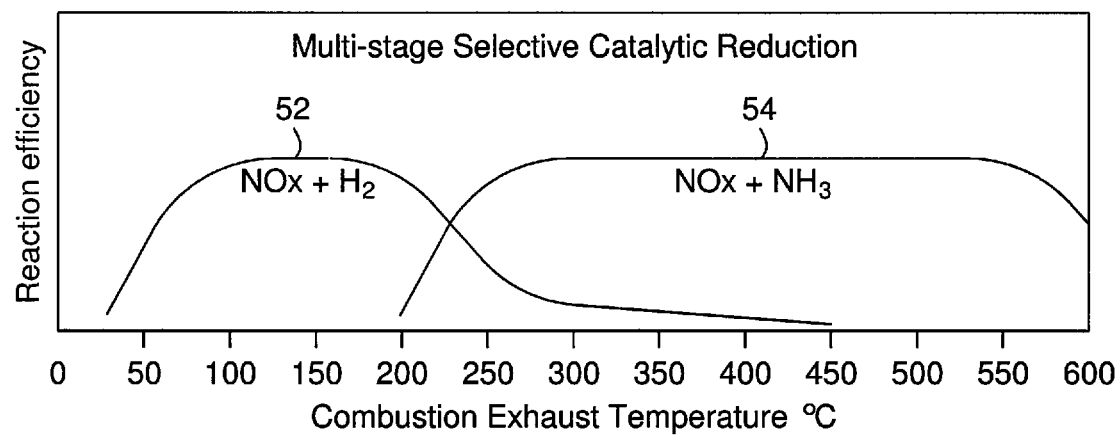
FIG. 3 schematically illustrates relative efficiencies of two stages of catalytic operation of the present SCR unit depending on the exhaust temperature.

FIG. 3 illustrates relative reaction efficiencies of NOx+ hydrogen and NOx+ammonia, depending on temperature. At temperatures from about 100° C. to about 260° C. the downstream catalyst portion 36 promotes hydrogen as a reducing agent. Hydrogen reacts with NOx to produce nitrogen and water via the catalytic effect of a metal or metals of the platinum group. At temperatures above about 260° C. the oxidizing catalytic function of metals of the platinum group in the downstream catalyst portion 36 increases. As a result, hydrogen is oxidized by oxygen in the exhaust gases into water at a much higher rate. This reduces the hydrogen available to react with nitrogen oxides.

As temperatures rise above about 200° C., a transition to ammonia as a reducing agent can be made by utilizing the upstream catalyst portion 34 of the catalytic device 32. Reduction reactions between NOx and ammonia continue in the downstream catalyst portion 36 via the same or a similar-acting catalyst as in the upstream catalyst portion, but these reactions occur at a lower rate due to increased activity of the oxidizing catalytic metals of the platinum group that convert ammonia to nitrogen and water. Simultaneously with oxidizing of ammonia, any carbon monoxide and hydrocarbons that may present in the exhaust gases are oxidized to nitrogen, $CO_2$, and water. The reduction and oxidizing activity ratio in the downstream catalyst portion 36 depends on the activity of oxidizing catalytic metals, operating parameters, and initial concentrations of the impurities in the combustion exhaust gases.

During a start-up period of a power generation unit such as a gas turbine the temperature of the SCR catalyst is not suitable to efficiently provide the reaction between ammonia and NOx but it is high enough to promote reaction between hydrogen and NOx within the downstream catalyst portion 36. During start-up, a small portion 24 of the hydrogen fuel flow to the power generation unit can be directed into the SCR unit 32 to serve as reducing agent. As the temperature of the SCR increases, the reaction between hydrogen and NOx becomes less favorable, and part of the hydrogen flow 25 is directed into the ammonia synthesis unit 28, where hydrogen and nitrogen react to produce ammonia that is forwarded 29 into the SCR unit 32 to complete reduction of NOx.

The amounts and proportions of hydrogen and ammonia supplied to the SCR unit may be automatically controlled 40 depending on the temperature and chemical composition of the exhaust gas 30. Sensors 42 can provide temperature, chemistry, and volume information to the process controller 40 to control mixing valves 26, 44 and other process controls in the system for this purpose When the temperature of the SCR unit 32 is too low for effective ammonia-NOx reaction, most or all of the hydrogen flow 23, 24 may be routed to the SCR unit 32, and little or no ammonia may be generated. When the temperature of the SCR unit 32 is in an optimal range for ammonia-NOx reaction, most or all of the hydrogen flow 23, 25 may be routed to the ammonia synthesis unit 28 to supply enough ammonia for the reaction. Excess ammonia is destroyed in the downstream catalyst portion 36 of the catalytic device 32, so only traces of ammonia slip into the ambient air.

Thus, the SCR unit 32 operates as a hydrogen or ammonia SCR depending on the temperature of the SCR unit. This provides low NOx emissions throughout a full range of operating and load conditions of a generation power unit, including effective reduction of NOx during start-up. This is impossible with a conventional ammonia SCR system because the start-up temperature is too low to facilitate reactions between NOx and $NH_3$. The system 20 may automatically adjust ammonia flow depending on NOx concentrations measured upstream of the SCR unit 32 by varying the amount of hydrogen 25 directed into the ammonia synthesis unit 28. The SCR unit can be designed to operate effectively between 50 and 550° C., or preferably between 105 and 350° C. It can be designed to operate at a gas hourly space velocity (GHSV) of 1,000-200,000 volumes per hour, or preferably 10,000-40,000 volumes per hour, with an exhaust stream containing between 5 and 21% oxygen.

Figure 4:
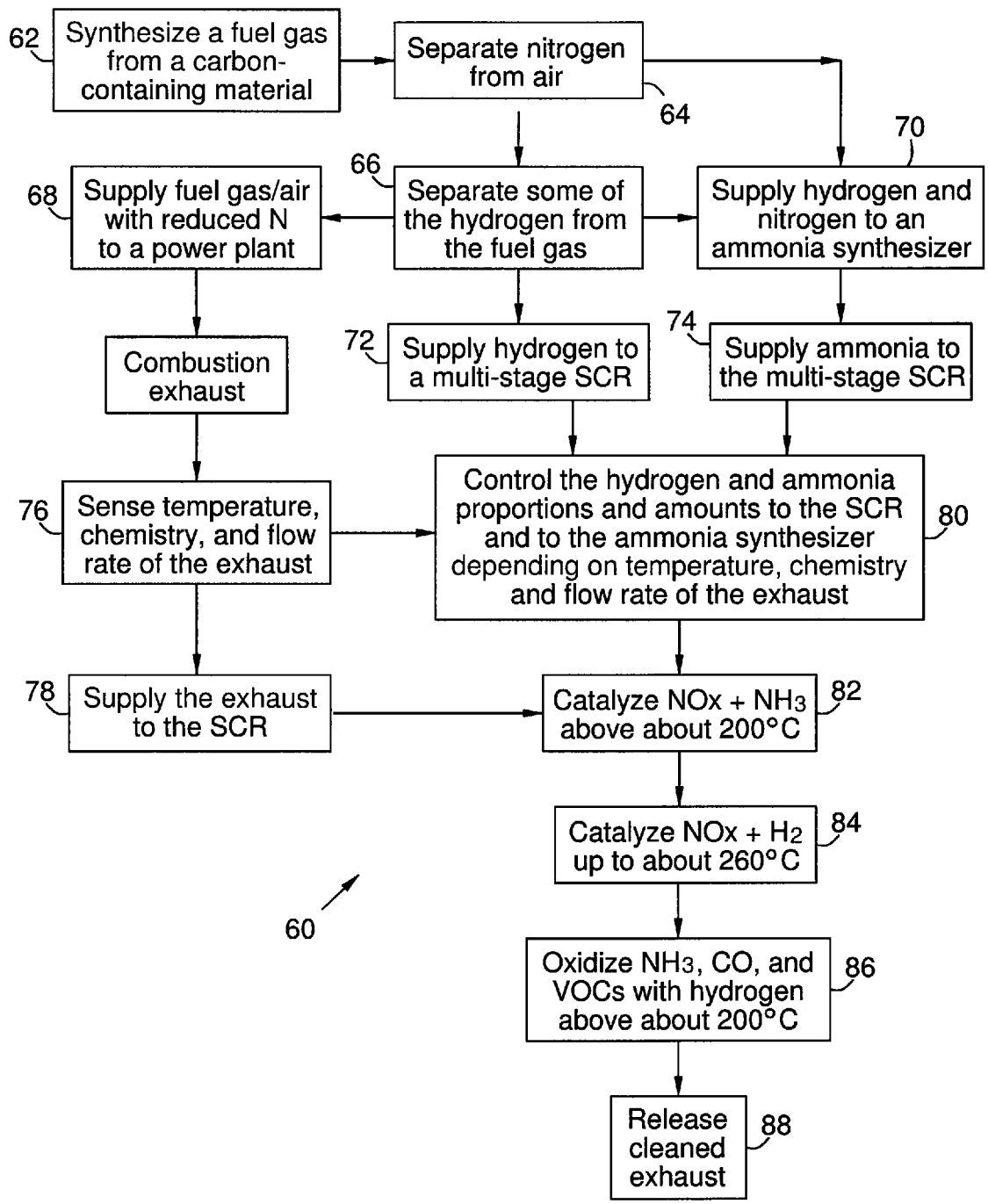
FIG. 4 illustrates a method of the invention.

FIG. 4 illustrates aspects of the invention as a method 60 of removing nitrogen oxides (NOx) from combustion exhaust, comprising: synthesizing 62 a fuel gas from a carbonaceous material, such as coal; separating 64 nitrogen from the air; separating 66 some of the hydrogen from the fuel gas; supplying 68 fuel gas and air with reduced nitrogen content to a power plant; supplying 70 hydrogen and nitrogen from the separation processes to an ammonia synthesizer; supplying 72 hydrogen from the hydrogen separation process to a multi-stage SCR unit; supplying 74 ammonia to the multi-stage SCR unit from the ammonia synthesizer; sensing 76 the temperature, chemistry, and flow rate of the power plant combustion exhaust, supplying 78 the exhaust to the SCR unit; controlling 80 the hydrogen and ammonia proportions and amounts supplied to the SCR unit and to the ammonia synthesizer depending on the temperature, chemistry, and flow rate of the exhaust; catalyzing 82 ammonia+NOx in the exhaust at temperatures above about 200° C.; catalyzing 84 hydrogen+NOx in the exhaust at temperatures up to about 260° C.; oxidizing 86 ammonia, CO, and VOCs in the exhaust with oxygen in the exhaust at temperatures above about 200° C.; and releasing 88 cleaned exhaust into the environment.

An alternative configuration of the catalytic element 34, 36 involves impregnating the upstream catalyst portion 34 of the catalyst bed with a small amount of platinum group metals, such as less than 1% of a platinum metal such as Ru, Rh, Pd, Os, Ir, or Pt, or less than 1% base metal such as W, Zr, Fe, Ni, Cu, Pb, or Zn. The downstream catalyst portion 36 remains the same as described previously. This configuration enhances the hydrogen activity as a reducing agent, but requires that the process be operated at a slightly greater $NH_3$ to $NO_x$ ratio in the ammonia SCR mode, since a small portion of the ammonia will be oxidized.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of removing nitrogen oxides (NOx) from combustion exhaust, comprising:
   synthesizing a fuel gas containing hydrogen by gasification of a carbonaceous material;
   separating some of the hydrogen from the fuel gas;
   mixing at least some of the separated hydrogen into the combustion exhaust;
   catalyzing a reaction between NOx in the combustion exhaust and the hydrogen that removes NOx from the exhaust at temperatures up to about 260° C.;
   separating nitrogen from air;
   synthesizing ammonia from at least some of the separated hydrogen and nitrogen;

mixing the ammonia into the combustion exhaust;
catalyzing a reduction reaction between NOx in the combustion exhaust and the ammonia that removes NOx from the exhaust at exhaust temperatures above about 200° C., wherein the catalyzing the reduction reaction between NOx and the ammonia comprises transitioning from primarily adding separated hydrogen to the combustion exhaust to primarily catalyze a reaction between NOx and the hydrogen in the combustion exhaust to primarily adding ammonia to the combustion exhaust to primarily catalyze the reduction reaction between NOx and the ammonia over a temperature range of between 200° C. and 260° C.; and
catalyzing oxidation reactions of ammonia, carbon monoxide, and volatile organic compounds in the exhaust downstream of the NOx-ammonia reaction at exhaust temperatures above about 200° C.

2. The method of claim 1, further comprising:
sensing a temperature of the combustion exhaust;
sensing a NOx concentration in the combustion exhaust; and
proportioning the separated hydrogen between a first and a second flow of the hydrogen, the first hydrogen flow routed to an injector that mixes the hydrogen into the combustion gas, and the second hydrogen flow routed to an ammonia synthesis unit that supplies the ammonia to the injector;
wherein when the temperature of the combustion exhaust is too low for effective ammonia-NOx reaction, the first hydrogen flow is increased relative to the second hydrogen flow, and when the temperature of the combustion exhaust is in an optimal range for ammonia-NOx reaction, the second hydrogen flow is increased relative to the first hydrogen flow.

3. The method of claim 1, further comprising:
sensing a temperature parameter of the combustion exhaust;
sensing a NOx concentration parameter in the combustion exhaust;
sensing a flow volume parameter of the combustion exhaust;
inputting the sensed parameters to a controller that automatically adjusts proportions and amounts of the hydrogen and the ammonia added into the combustion exhaust depending on operating conditions, wherein when the temperature of the combustion exhaust is too low for effective ammonia-NOx reaction, proportionally more hydrogen and less ammonia is added into the combustion exhaust, and when the temperature of the combustion exhaust is in an optimal range for ammonia-NOx reaction, proportionally more ammonia and less hydrogen is added into the combustion exhaust.

* * * * *